United States Patent [19]

Goren

[11] Patent Number: 5,302,813

[45] Date of Patent: Apr. 12, 1994

[54] MULTI-BIT DIGITIZER

[75] Inventor: David P. Goren, Bonkonkoma, N.Y.

[73] Assignee: Symbol Technologies, Inc., Bohemia, N.Y.

[21] Appl. No.: 862,471

[22] Filed: Apr. 2, 1992

[51] Int. Cl.⁵ .............................................. G06K 7/10
[52] U.S. Cl. ................................................. 235/462
[58] Field of Search ............................... 235/462, 463

[56] References Cited

U.S. PATENT DOCUMENTS

| | | | |
|---|---|---|---|
| 3,932,840 | 1/1976 | Hanchett | 235/463 |
| 4,184,179 | 1/1980 | Demig | 235/463 |
| 4,251,798 | 2/1981 | Swartz et al. | 300/146.3 |
| 4,496,831 | 1/1985 | Swartz et al. | 235/472 |
| 4,500,776 | 2/1985 | Laser | 235/162 |
| 4,740,675 | 4/1988 | Brosnan et al. | 235/463 |
| 4,746,789 | 5/1988 | Gieles et al. | 235/463 |
| 4,758,717 | 7/1988 | Shepard et al. | 235/472 |
| 4,782,220 | 11/1988 | Shuren | 235/462 |
| 4,798,943 | 1/1989 | Cherry | 235/463 |
| 4,855,581 | 8/1989 | Mertel et al. | 235/463 |
| 4,859,840 | 8/1989 | Hasegawa et al. | 235/463 |
| 4,933,538 | 6/1990 | Heiman et al. | 235/462 |
| 4,973,829 | 11/1990 | Ishida et al. | 235/462 |
| 5,029,183 | 7/1991 | Tymes | 375/1 |

Primary Examiner—Raymond A. Nelli

[57] ABSTRACT

A multi-bit digitizer for a bar code reader for detecting and reading bar code symbols, which are generally printed on a label or on the surface of an article. The multi-bit digitizer detects the presence of edges of a scanned bar code symbol, and also measures the strength of each detected edge therein. During a scanning operation, a sensor senses light reflected from a bar code symbol and produces an analog scan signal representative thereof. Positive and negative edges in the analog scan signal are detected, and timing signals are developed representative thereof. The strength of each detected edge in the analog scan signal is also measured, and digital signals are developed representative thereof. The timing signals and digital signals are directed as inputs to a decoder which performs multiple threshold processing on each individual analog scan signal by processing each analog scan signal a multiple number of times at different detection threshold levels. The ability to perform multiple thresholding on a single scan is significant for the development of very aggressive wands in which only a single scan is available for processing.

20 Claims, 11 Drawing Sheets

MULTI-BIT DIGITIZER

BACKGROUND OF THE INVENTION

1. Field of the Invention

The present invention relates generally to a multi-bit digitizer for a bar code reader which detects bar code symbols which are generally printed on a label or on the surface of an article. More particularly, the subject invention pertains to a multi-bit digitizer as described which detects the presence of edges in a bar code symbol and also measures the strength of each detected edge.

2. Discussion of the Prior Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, light beam, at a target and a symbol to be read.

The light source in a laser scanner is typically a gas laser or semiconductor laser. The use of a semiconductor device such as a laser diode as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For the purpose of our discussion, characters recognized and defined by a symbology shall be referred to as legitimate characters, while characters not recognized and defined by that symbology are referred to as illegitimate characters. Thus an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two-dimensional bar codes; that is, the reader must be aimed at each row, individually. Likewise, the multiple-scan-line readers produce a number of scan lines at an angle to one another so these are not suitable for recognizing a Code 49 type of two-dimensional symbols.

In the scanning systems known in the art, the light beam is directed by a lens or similar optical components along a light path toward a target that includes a bar code symbol on the surface. The scanning functions by repetitively scanning the light beam in a line or series of lines across the symbol. The scanning component may either sweep the beam spot across the symbol and trace a scan line across and past the symbol, or scan the field of view of the scanner, or do both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader is one which incorporates detectors based upon charge coupled device (CCD) technology. In such readers size of the detector is larger than or substantially the same as the symbol to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

SUMMARY OF THE INVENTION

Accordingly, it is a primary object of the present invention to provide a multi-bit digitizer for a bar code reader for detecting bar code symbols which detects the presence of an edge of a bar code symbol and also measures the strength of each detected edge therein.

A further object of the subject invention is the provision of a multi-bit digitizer for a bar code reader which enhances the bar code reader performance by defining an improved digital interface, together with appropriate software algorithm routines. Whereas a standard digitizer only detects the presence of an edge, the multi-bit digitizer of the present invention detects the presence of an edge and also measures the strength of each detected edge. This additional information is passed to a decoder to facilitate multi-threshold processing of a single scan in software algorithm routines. The decoder performs multiple thresholding on a single scan using a minimal number of computations. The ability to perform multiple thresholding on a single scan is significant for the development of very aggressive wands in which only a single scan is available for processing.

In accordance with the teachings herein, the present invention provides a multiple bit digitizer for a bar code reader in which a sensor senses light reflected from a bar code symbol and produces an analog scan signal representative thereof. Positive and negative edges in the analog scan signal are detected, and timing signals are developed representative thereof. The strength of each detected edge in the analog scan signal is measured, and digital signals are developed representative thereof. The timing signals and digital signals are directed as inputs to a decoder which performs multiple threshold processing on each individual analog scan signal by processing each analog scan signal a multiple number of times at different detection threshold levels.

In greater detail, the digital signals representative of edge strength also indicate whether the detected edge is a positive or negative edge. The decoder includes software routines for performing multiple threshold processing on each individual analog scan signal. The software routines convert the digital signals representative of the strength of each detected edge to a standard timing signal format which is then directed to a standard decoder algorithm for decoding to a bar code symbol. The output of the standard decoder algorithm is evaluated for the validity of the decoded bar code symbol output, and if the decoded bar code symbol output is not a valid bar code symbol, a different threshold is selected to again convert the digital signals representative of the strength of each detected edge to a standard timing signal format.

In a preferred embodiment, the sensor, the signal edge detector, and the edge strength measuring means are all implemented in circuits in hardware, and the decoder is implemented in software routines. The signal edge detector and the edge strength measuring means include a first differentiator circuit for taking a first time derivative signal of the analog scan signal, and a second differentiator circuit for taking a second time derivative signal of the analog scan signal. The signal edge detector and the edge strength measuring means also include a first sample and hold circuit for processing the analog scan signal, and a second sample and hold circuit for processing the difference between the analog scan signal and the output signal of the first sample and hold circuit.

BRIEF DESCRIPTION OF THE DRAWINGS

The foregoing objects and advantages of the present invention for a multi-bit digitizer may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
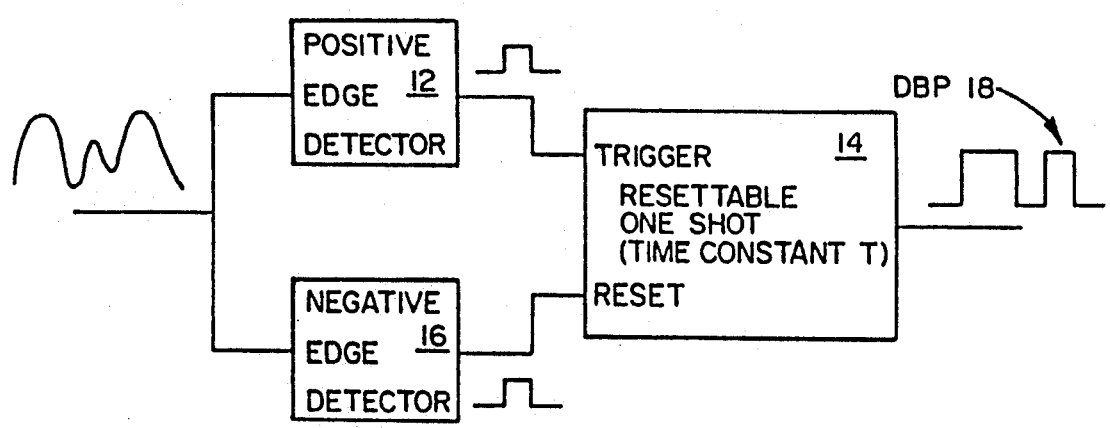
FIG. 1 illustrates a standard prior art digitizer circuit for processing an analog scan signal produced by a bar code detector.

Referring to the drawings in detail, FIG. 1 illustrates a standard prior art digitizer circuit for processing an analog signal produced by a bar code detector. The prior art digitizer circuit includes a positive edge detector circuit 12 which sets a resettable one shot circuit 14 having a time constant T, and a negative edge detector circuit 16 which resets the one shot circuit 14, resulting in a detected bar code pattern (DBP) 18. The advantages of this prior art digitizer circuit are that it presents a relatively simple digital interface to a decoder, and that the interface has become an industry standard. The disadvantages of this prior art digitizer circuit are that all edges are treated equally, the digitizer only responds to the first occurrence of a particular edge type (either positive or negative), and the time constant T is usually fixed and not adaptive.

Figure 2:
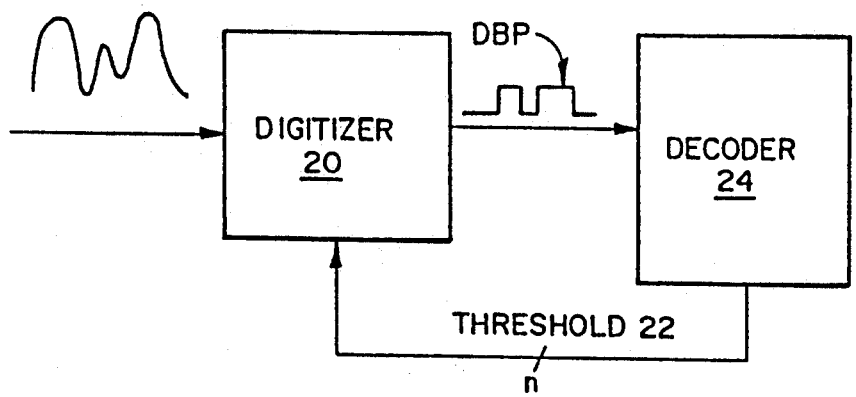
FIG. 2 illustrates a second prior art multiple thresholding digitizer circuit for processing an analog scan signal produced by a bar code detector which selects a detection threshold value based upon previous scan data.

FIG. 2 illustrates a second prior art multi-thresholding digitizer circuit for processing an analog signal produced by a bar code detector in which a digitizer 20 selects a detection threshold value 22 based upon previous scan data, and whether a decoder 24 has produced a valid or invalid detected bar code symbol. An advantage of this circuit is that it requires only slight modifications to a standard decoder interface circuit as illustrated in FIG. 1. The disadvantages of this circuit are that it may need multiple scans to set a proper threshold (not good for aggressive wands), it reduces the effective scan rate if a symbol cannot be read at all threshold levels, and further it is difficult to combine multiple partial scans to form a good scan as it is relatively difficult to synchronize the multiple scans.

Figure 3:
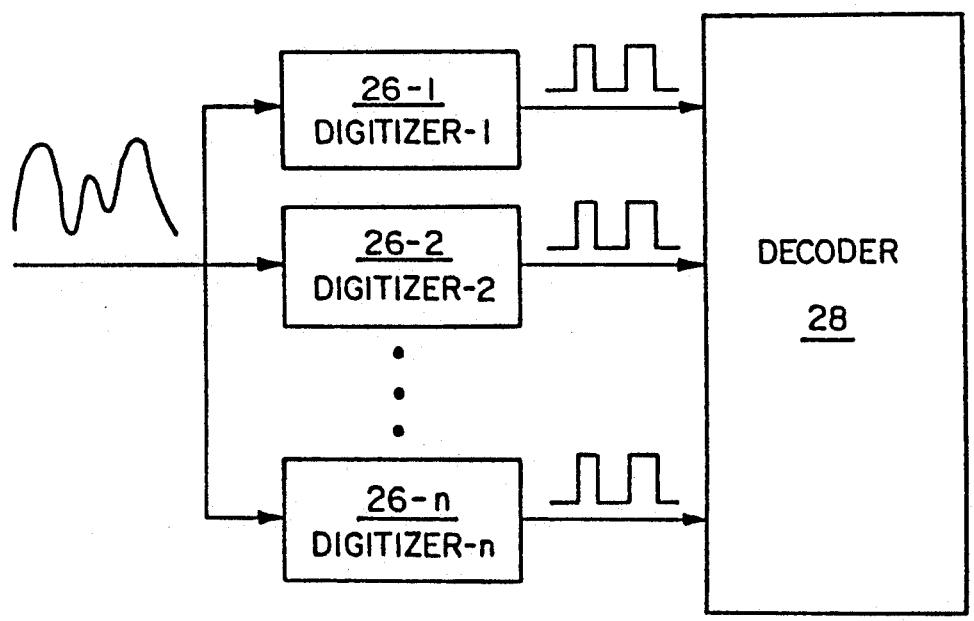
FIG. 3 depicts a third prior art digitizer circuit for processing an analog scan signal produced by a bar code detector which incorporates therein multiple digitizer circuits in parallel, each of which processes the analog scan signal with a different threshold value.

FIG. 3 depicts a third prior art digitizer circuit for processing an analog signal produced by a bar code detector which incorporates therein multiple digitizer circuits 26-1, 26-2, 26-n (as in FIG. 1) arranged in parallel. The advantages of this arrangement are that the multiple parallel digitizer circuits result in multiple attempts to decode from a single scan (good for aggressive wands), and that the synchronization of the digitizer outputs allows partial scan combination. The disadvantages of this arrangement are that it provides a complex interface to the decoder 28, and it is difficult to add more digitizers.

Figure 4:
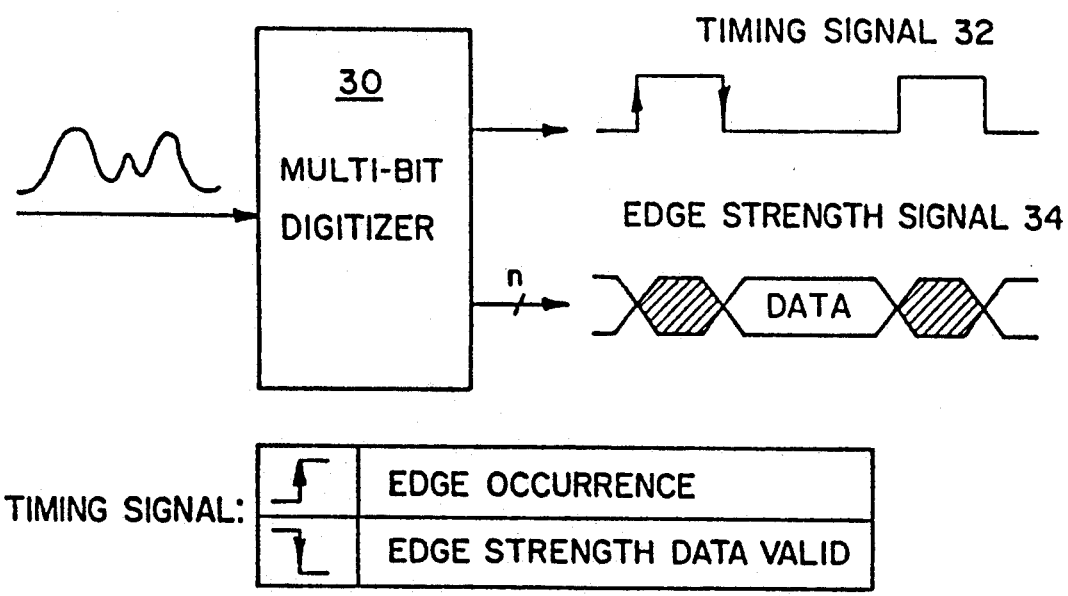
FIG. 4 illustrates a multiple bit digitizer circuit pursuant to the present invention for processing an analog scan signal produced by a bar code detector which detects the occurrence of edges in the analog scan signal and also measures the strength of each detected edge, thereby enabling a decoder to perform multiple threshold processing on a single analog scan signal.

FIG. 4 illustrates a multi-bit digitizer 30 pursuant to the present invention which detects the presence of an edge and also measures the strength of each detected edge, which enables a decoder to perform multiple thresholding processing on a single scan in software routines. The multi-bit digitizer 30 produces a timing signal 32 for each detected edge, and also develops an edge strength signal 34 for each detected edge, which is an n-bit digital signed integer representing edge strength and type (positive or negative). The timing signals 32 and digital edge strength signals 34 are directed to a decoder which performs multi-thresholding for each scan signal by software algorithm routines therein.

The advantages of this arrangement are that the decoder algorithm can attempt many different thresholds on a single scan [excellent for aggressive wands), and also more levels of edge detection can be added without changing the decoder interface dramatically. The disadvantage of this arrangement is that the decoder algorithm has to construct the detected bar code pattern from the timing signals and the digital edge strength signals, thereby increasing the number of computations.

Figure 5:
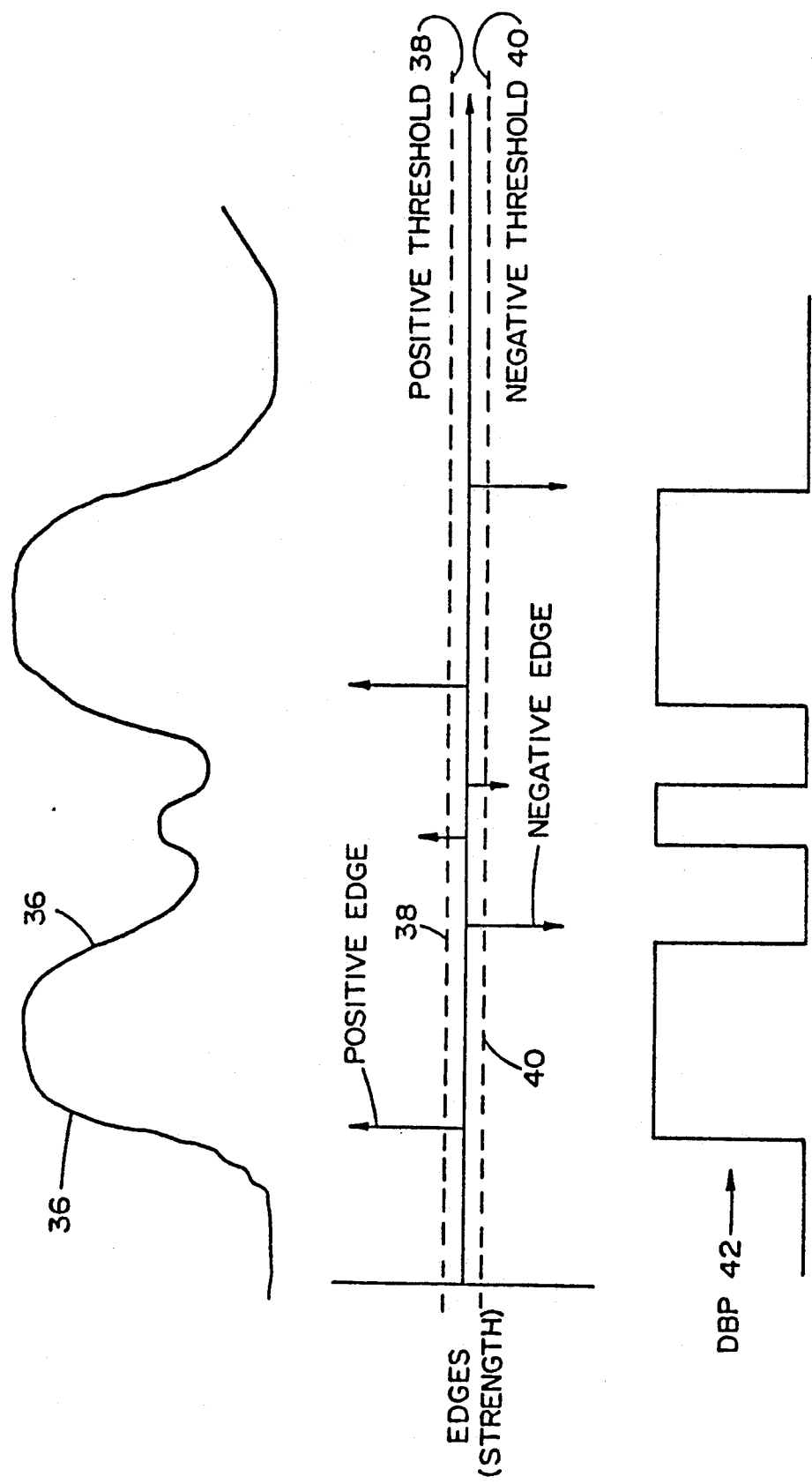
FIGS. 5 and 6 illustrate waveforms and signals useful in explaining the operation of a multiple bit digitizer circuit pursuant to the subject invention in which a digital signal representative of the strength of each detected edge allows software in a decoder to perform multiple threshold processing on a single analog scan signal.
Figure 6:
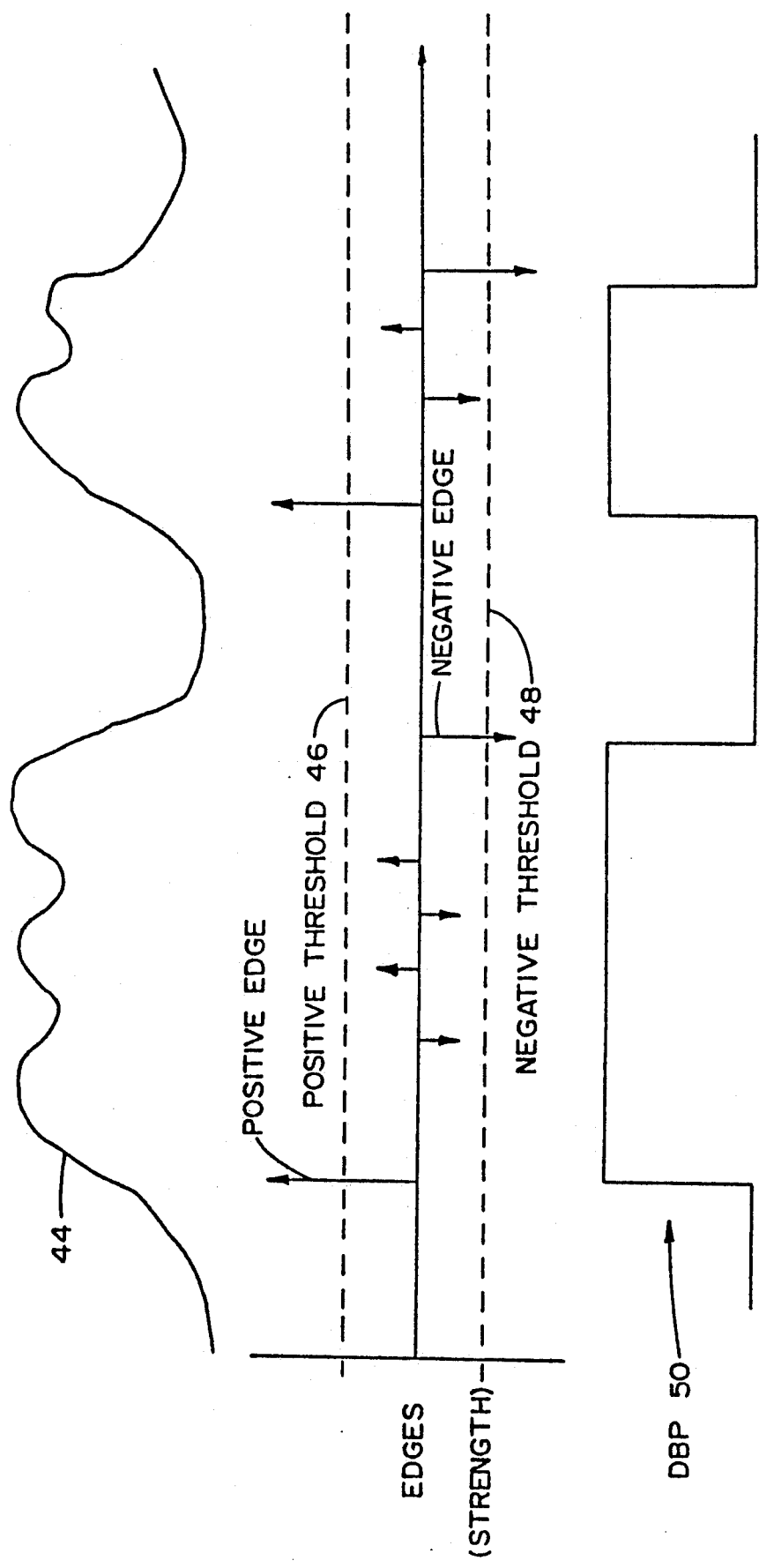

FIGS. 5 and 6 illustrate waveforms and signals useful in explaining the operation of a multi-bit digitizer circuit pursuant to the present invention. In the example of FIG. 5, an analog detection signal 36 is representative of a high density symbol, and the software positive and negative thresholds 38, 40 are set fairly low, resulting in the detected bar code pattern 42 at the bottom of FIG. 5. In the example of FIG. 6, an analog detection signal 44 is representative of a printed dot matrix signal (wherein the edges of the individual dots therein should not be treated as edges of a bar or space), and the software positive and negative thresholds 46, 48 are set fairly high, resulting in the detected bar code pattern 50 at the bottom of FIG. 6.

Figure 7:
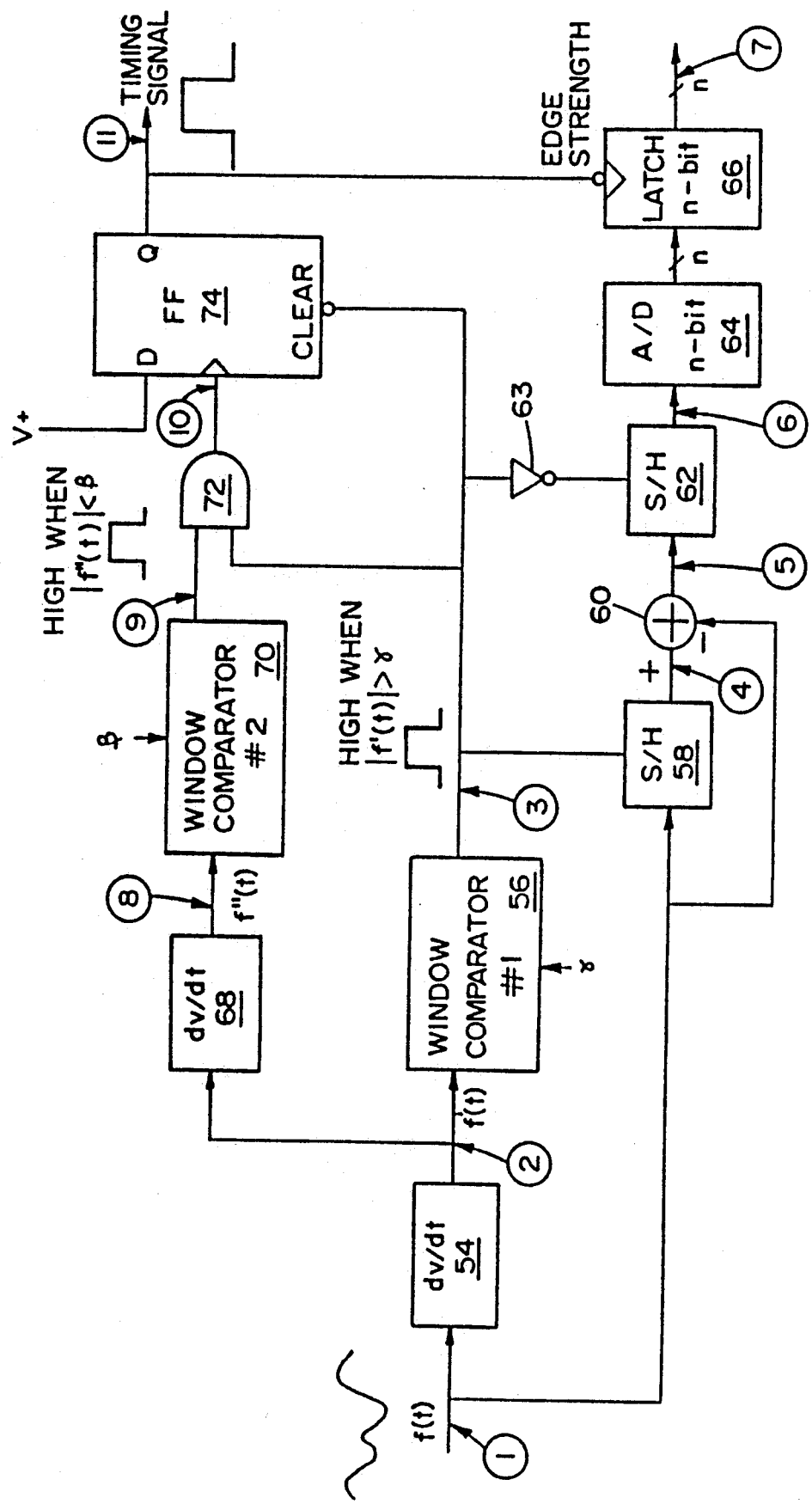
FIG. 7 is a detailed block diagram of a first embodiment of a multi-bit digitizer circuit pursuant to the present invention.
Figure 8:
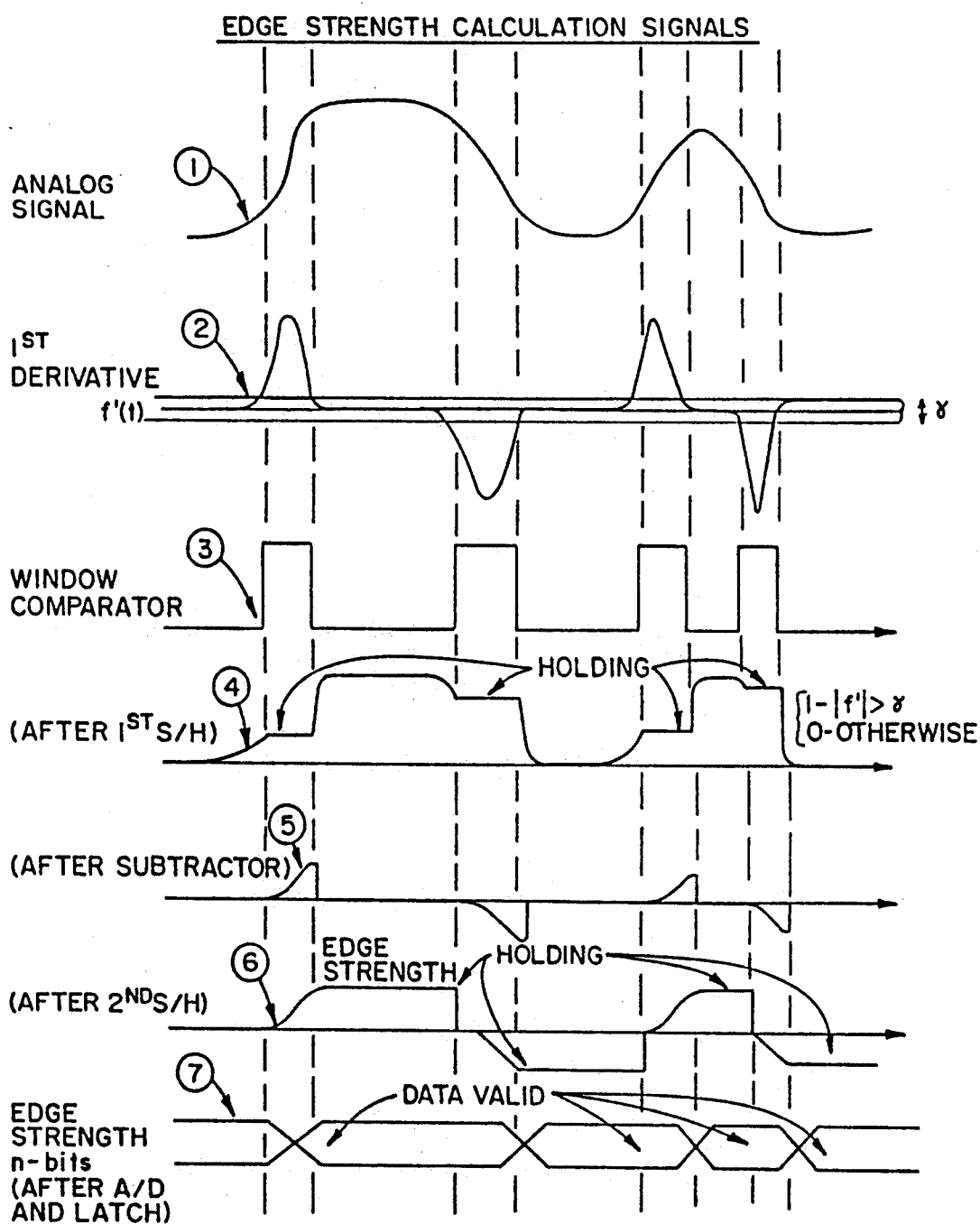
FIGS. 8 and 9 illustrate exemplary waveforms 1 through 11 which are generated at locations 1 through 11 in and by the multi-bit digitizer circuit of FIG. 7, which are useful in explaining the operation of the circuit.
Figure 9:
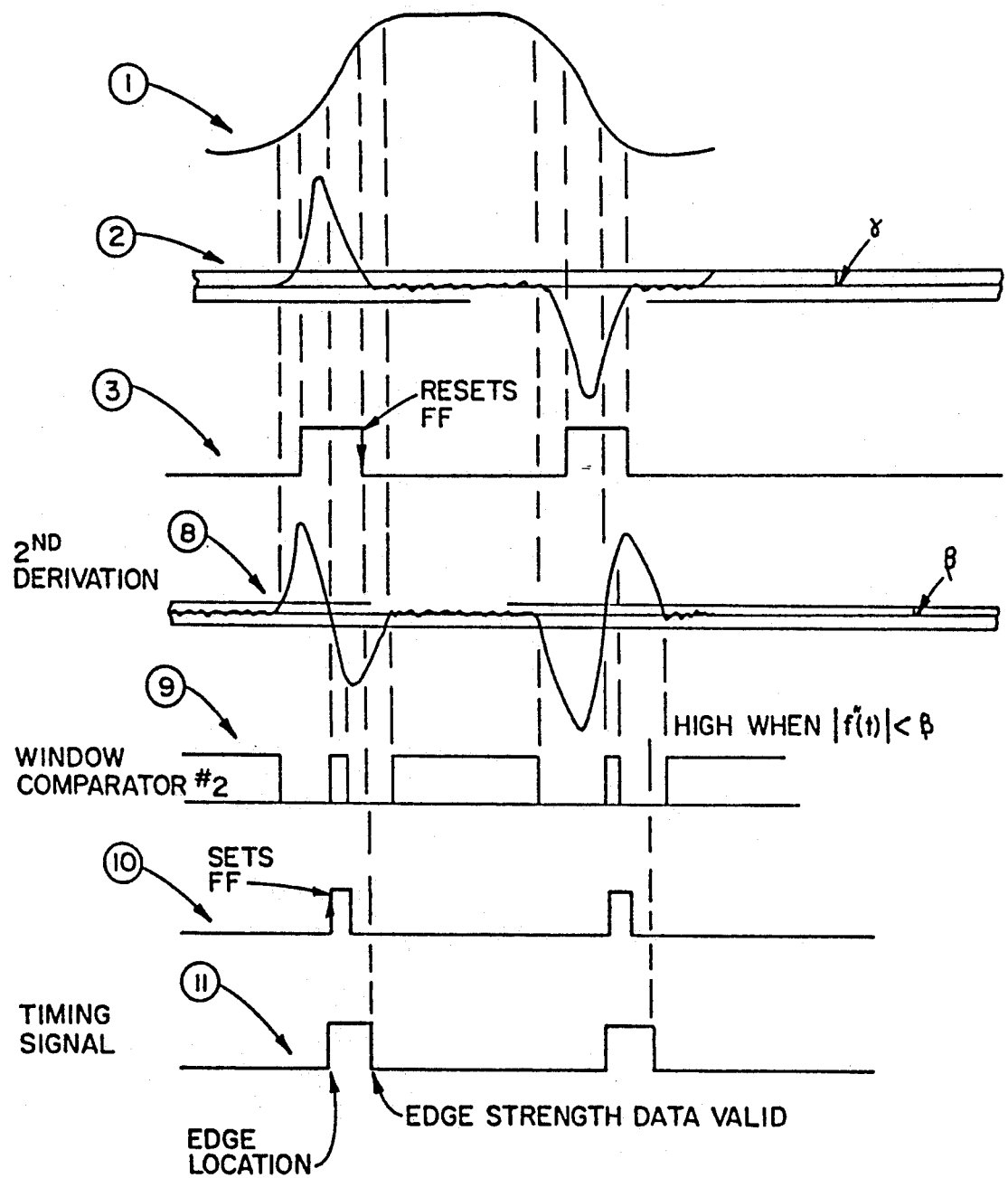

FIG. 7 is a detailed block diagram of a first embodiment of a multi-bit digitizer circuit pursuant to the present invention for detecting edges in an analog scan signal and also for measuring the strength of each detected edge. FIGS. 8 and 9 illustrate exemplary waveforms 1 through 11 which are generated at locations 1 through 11 in and by the multi-bit digitizer circuit of FIG. 7, which are useful in explaining the operation of the circuit.

In the circuit of FIG. 7, an analog signal f(t) 1, FIGS. 7 and 8, is directed to a first differentiator circuit 54 which develops a first time derivative signal 2, FIGS. 7 and 8, of the analog scan signal. The first time derivative signal 2 is directed to a first window comparator circuit 56, which utilizes thresholds $\gamma$ to develop a digital signal 3, FIGS. 7 and 8. The digital signal 3 is directed to a first sample and hold circuit 58 which receives the analog signal 1 as an input, and based upon the digital signal 3, develops an output first sample and hold signal 4, FIGS. 7 and 8. A summation circuit 60 receives the first sample and hold signal 4 on its positive input and the analog signal 1 on its negative input, and additively combines the two inputs to produce a subtracted signal 5, FIGS. 7 and 8. The signal 5 is directed as an input to a second sample and hold circuit 62 which, based upon an inversion of the digital signal 3 by an inverter 63, develops a second sample and hold signal 6, FIGS. 7 and 8. The signal 6 is directed as an input to an n-bit A/D converter 64, which provides an n-bit digital output for an n-bit latch which stores the signal and produces an n-bit edge strength signal 7, FIGS. 7 and 8.

The first time derivative signal 2, FIGS. 7 and 8, is also directed as input to a second differentiator circuit 68 which develops a second time derivative signal 8, FIGS. 7 and 9, which is directed to a second window comparator circuit 70. The circuit 70 utilizes thresholds $\beta$ to develop a digital signal 9, FIGS. 7 and 9. The digital signal 9 is directed to an AND gate, which also receives the digital signal 3 as an input, and ANDs the two signals to develop a gating signal 10, FIGS. 7 and 9, which sets a flip flop 74. The flip flop is reset by signal 3 from the first window comparator 56. As a consequence thereof, the flip flop 74 develops a timing output signal 11, FIGS. 7 and 9. The two output signals, the timing signal 11, and the n-bit digital edge strength signal 7, are then analyzed in software.

Figure 10:
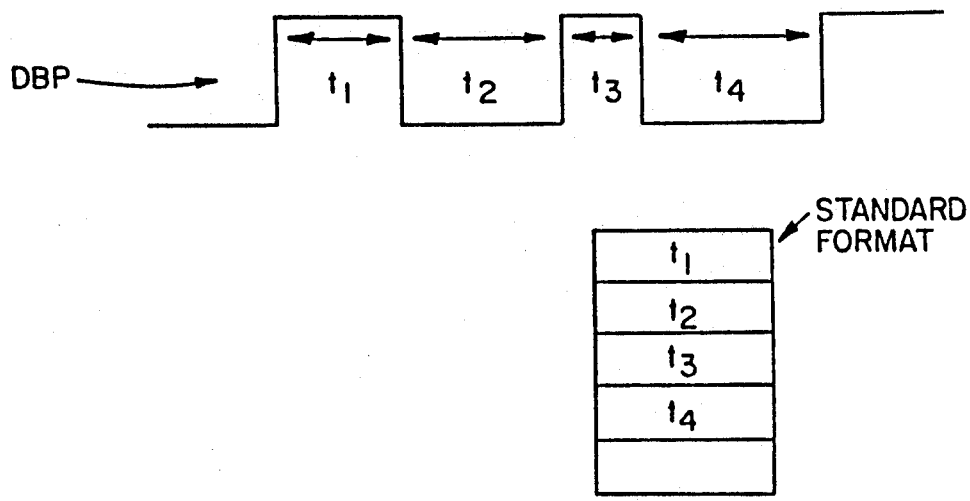
FIGS. 10, 11 and 12 illustrate waveforms and memory formats which are useful in explaining the operation of the present invention.
Figure 11:
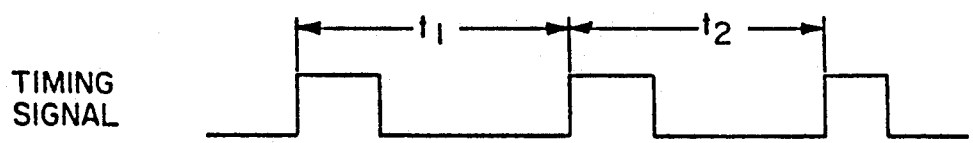
Figure 11:
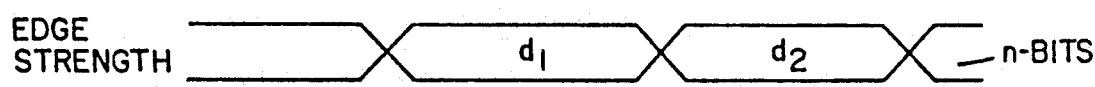
Figure 11:
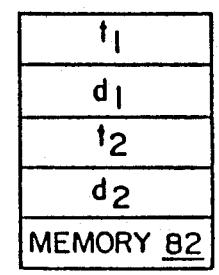
Figure 12:
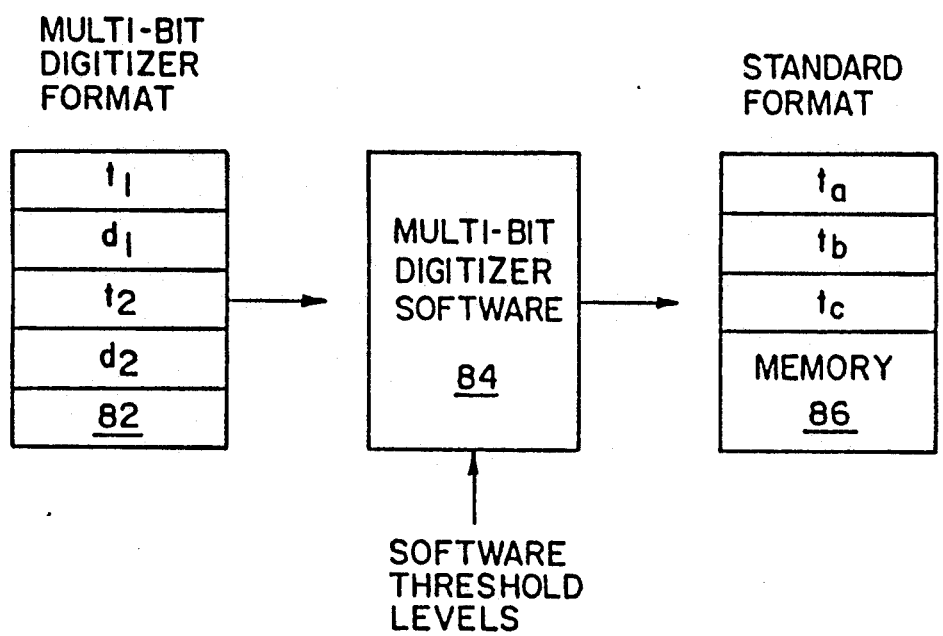

FIGS. 10, 11 and 12 illustrate waveforms and memory formats which are useful in explaining the operation of the present invention.

Referring to FIG. 10, in a standard digitizer such as illustrated in FIG. 1, the detected edges, which can be defined by t1, t2, t3, t4, etc., are placed in a memory 80, and a standard decoder algorithm then reads the data on t1, t2, t3, t4, etc. from memory and decodes it to a bar code signal.

FIG. 11 illustrates the timing signals t1, t2, etc. developed as outputs from the flip flop 74 in the exemplary circuit of FIG. 7, and the n-bit edge strength signals d1, d2 developed as outputs from the A/D converter 64, all of which are placed in a memory 82.

As illustrated in FIG. 12, the output of the memory 82 is directed to multi-bit digitizer software 84, which utilizes different threshold values to convert the data to a standard format of data which are placed in a memory 86, similar to the standard format of FIG. 10, which can then be converted by a standard decoder algorithm to a bar code symbol.

Figure 13:
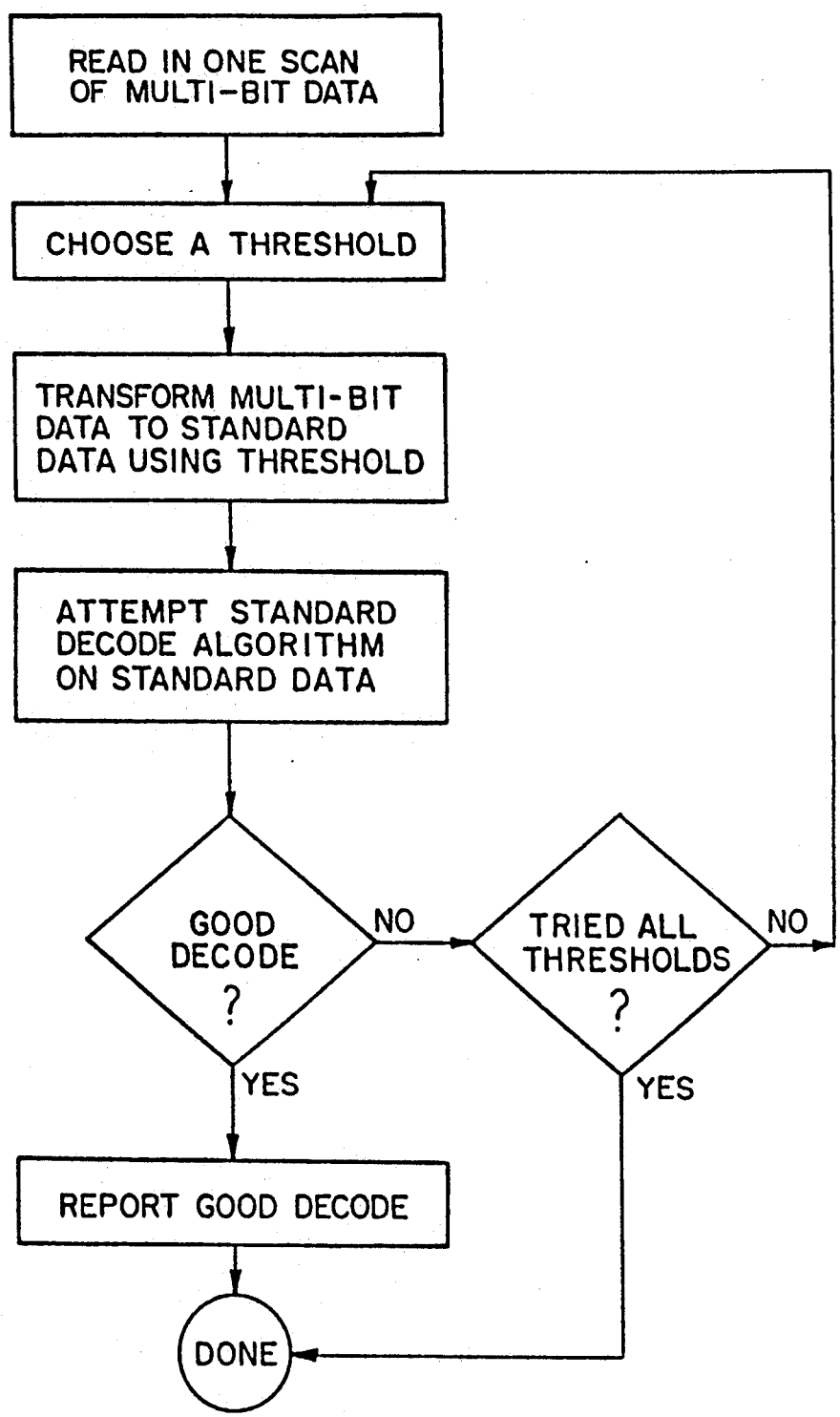
FIG. 13 is a logic flow diagram illustrating the operation of transform software for processing and converting the multi-bit memory data to a standard format so that a standard decoder algorithm can decode the data to a bar code, and also for modifying the threshold used during processing of the multi-bit memory data.

FIG. 13 is a logic flow diagram explaining transform software for processing and converting the multi-bit memory data to a standard format so that a standard decoder algorithm can decode the data to a bar code, and also illustrates a logic flow diagram of software for modifying the threshold used during processing of the multi-bit memory data. One scan of the multi-bit data in memory is read into the decoder which chooses a threshold value, and based thereon, transforms the multi-bit data to a standard data format A standard decoder algorithm then decodes the standard data. If the result is a valid acceptable bar code pattern, a valid decode is reported and the sequence is finished. If the result is an invalid bar code pattern, the routine then proceeds through a sequence of alternative threshold values in different processing loops until a valid acceptable bar code pattern is reported.

It is also possible to change the threshold dynamically while decoding a single scan. For example, the standard decode algorithm can decode character by character until an invalid character is reached and then try different thresholds in that invalid character until a valid character is found.

Figure 14:
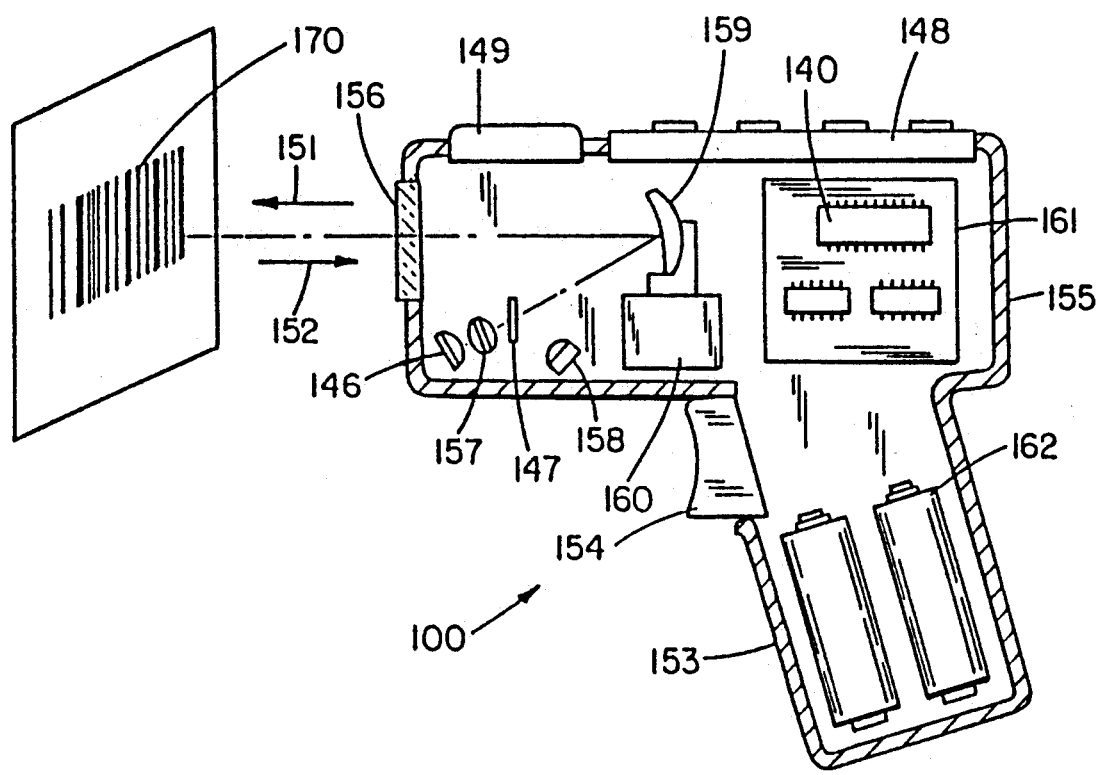
FIG. 14 illustrates a highly simplified embodiment of one type of bar code reader which can be utilized in association with the multiple bit digitizer circuit of the present invention.

FIG. 14 illustrates a highly simplified embodiment of one type of bar code reader that may be modified to utilize the multi-bit digitizer of the present invention. A reader 100 may be implemented in a hand-held scanner, as illustrated, or a desk-top workstation or stationery scanner. In a preferred embodiment, the arrangement is implemented in a housing 155 that includes an exit port 156 through which an outgoing laser light beam 151 is directed to impinge on, and to be scanned across, symbols 170 located exteriorly of the housing.

The hand-held device of FIG. 14 is generally of the style disclosed in U.S. Pat. No. 4,760,248 issued to Swartz et al., or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz et al. or U.S. Pat. No. 4,409,470 issued to Shepard et al., both such patents assigned to Symbol Technologies, Inc., may be employed in constructing the bar code reader unit of FIG. 15. These Patents 4,760,248, 4,896,026, and 4,409,470 are incorporated herein by reference, but the general design of such devices will be briefly described here for reference.

Referring to FIG. 14 in more detail, an outgoing light beam 151 is generated in the reader 100, usually by a laser diode or the like, and directed to impinge upon a bar code symbol disposed on a target a few inches from the front of the reader unit. The outgoing beam 151 is scanned in a scan pattern, and the user positions the hand-held unit so this scan pattern traverses the symbol to be read. Reflected and/or scattered light 152 from the symbol is detected by a light-responsive device 158 in the reader unit, producing serial electrical signals to be processed and decoded for reproducing the data represented by the bar code. As used hereinafter, the term "reflected light" shall mean reflected and/or scattered light.

In a preferred embodiment, the reader unit 100 is a gun shaped device having a pistol-grip type of handle 153. A movable trigger 154 is employed to allow the user to activate the light beam 151 and detector circuitry when the user has positioned the device to point at the symbol to be read. A lightweight plastic housing 155 contains the laser light source 146, the detector 158, the optics 157, 147, 159, and signal processing circuitry including a CPU 140 as well as power source or batter 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of perhaps several inches.

The reader 100 may also function as a portable computer terminal, and include a keyboard 148 and a display 149, such as described in the previously noted U.S. Pat. No. 4,409,470.

As further depicted in FIG. 14, a suitable lens 157 (or multiple lens system) may be used to focus the scanned beam onto the bar code symbol at an appropriate reference plane. A light source 146 such as a semiconductor laser diode is positioned to introduce a light beam into the axis of the lens 157, and the beam passes through a partially silvered mirror 147 and other lenses or beam-shaping structure as needed, along with an oscillating mirror 159, which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol before pulling the trigger 154.

Although the present invention has been described with respect to reading one or two dimensional bar codes, it is not limited to such embodiments, but may also be applicable to more complex indicia scanning applications. It is conceivable that the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control of data lines associated with such components may be connected to an electrical connector mounted on the edge or external surface of the module to enable the module to be electrically connected to a mating connector associated with other elements of a data acquisition system.

An individual module may have specific scanning or decoding characteristics associated therewith, e.g., operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

While several embodiments and variations of the present invention for a multi-bit digitizer are described in detail herein, it should be apparent that the disclosure and teachings of the present invention will suggest many alternative designs to those skilled in the art.

What is claimed is:

1. A multiple bit digitizer for a bar code reader, comprising:
   a. a sensor means for sensing light reflected from a bar code symbol and for producing an analog scan signal representative thereof;
   b. means for detecting positive and negative edges in the analog scan signal and for developing timing signals representative thereof;
   c. means for measuring the strength of each detected edge in the analog scan signal and for developing digital signals representative thereof; and
   d. decoder means, receiving said timing signals and said digital signals as inputs, for performing multiple threshold processing on each individual analog scan signal by processing each analog scan signal a multiple number of times at different detection threshold levels.

2. A multiple bit digitizer for a bar code reader as claimed in claim 1, wherein the digital signal developed by said measuring means also indicates whether the detected edge is a positive or negative edge.

3. A multiple bit digitizer for a bar code reader as claimed in claim 1, wherein said decoder means includes software routines for performing multiple threshold processing on each individual analog scan signal.

4. A multiple bit digitizer for a bar code reader as claimed in claim 3, wherein said software routines convert the digital signals representative of the strength of each detected edge to a standard timing signal format which is then directed to a standard decoder algorithm for decoding to a bar code symbol.

5. A multiple bit digitizer for a bar code reader as claimed in claim 4, wherein the output of the standard decoder algorithm is evaluated for the validity of the decoded bar code symbol output, and if the decoded bar code symbol output is not a valid bar code, a different threshold is selected to convert the digital signals representative of the strength of each detected edge to a standard timing signal format.

6. A multiple bit digitizer for a bar code reader as claimed in claim 1, wherein said sensor means, said detecting means, and said measuring means are implemented in circuits in hardware, and said decoder means is implemented in software routines.

7. A multiple bit digitizer for a bar code reader as claimed in claim 1, wherein said detecting means and said measuring means include a differentiator circuit means for taking a first time derivative signal of the analog scan signal.

8. A multiple bit digitizer for a bar code reader as claimed in claim 7, wherein said detecting means and said measuring means include a differentiator circuit means for taking a second time derivative signal of the analog scan signal.

9. A multiple bit digitizer for a bar code reader as claimed in claim 8, including a first sample and hold circuit for processing the analog scan signal.

10. A multiple bit digitizer for a bar code reader as claimed in claim 9, including a second sample and hold circuit for processing the difference between the analog scan signal and the output signal of said first sample and hold circuit.

11. A multiple bit digitizer for a bar code reader as claimed in claim 1, incorporated in a portable, hand-held bar code scanner.

12. A multiple bit digitizer for a bar code reader as claimed in claim 4, wherein said portable, hand-held bar code scanner includes a housing with a handle for enabling an operator to grasp the housing during the reading of a bar code symbol.

13. A method of reading a bar code symbol, comprising:
   a. sensing light reflected from a bar code symbol and producing an analog scan signal representative thereof;
   b. detecting positive and negative edges in the analog scan signal and developing timing signals representative thereof;
   c. measuring the strength of each detected edge and developing digital signals representative thereof; and
   d. performing multiple threshold processing on each individual analog scan signal by processing each analog scan signal a multiple number of times at different detection threshold levels.

14. A method of reading a bar code symbol as claimed in claim 13, wherein the developed digital signal also indicates whether the detected edge is a positive or negative edge.

15. A method of reading a bar code symbol as claimed in claim 13, wherein said step of performing multiple threshold processing on each individual analog scan signal is performed in software routines.

16. A method of reading a bar code symbol as claimed in claim 15, wherein said software routines convert the digital signals representative of the strength of each detected edge to a standard timing signal format which is then directed to a standard decoder algorithm for decoding to a bar code symbol.

17. A method of reading a bar code symbol as claimed in claim 16, wherein the output of the standard decoder algorithm is evaluated for the validity of the decoded bar code symbol output, and if the decoded bar code symbol output is not a valid bar code, a different threshold is selected to convert the digital signals representative of the strength of each detected edge to a standard timing signal format.

18. A multiple bit digitizer for a bar code reader as claimed in claim 13, wherein said steps of sensing, detecting, and measuring are performed in circuits in hardware, and said multiple threshold processing is implemented in software.

19. A method of reading a bar code symbol as claimed in claim 13, performed in a portable, hand-held bar code scanner.

20. A method of reading a bar code symbol as claimed in claim 13, further including illuminating the bar code symbol with a laser diode.

* * * * *